(12) United States Patent
Birdsall et al.

(10) Patent No.: US 10,621,000 B2
(45) Date of Patent: Apr. 14, 2020

(54) REGULATING ENTERPRISE DATABASE WAREHOUSE RESOURCE USAGE OF DEDICATED AND SHARED PROCESS BY USING OS KERNELS, TENANTS, AND TABLE STORAGE ENGINES

(71) Applicant: Hewlett Packard Enterprise Development LP, Houston, TX (US)

(72) Inventors: David W. Birdsall, Santa Clara, CA (US); Gary S. Smith, Auburn, CA (US); Shang-Sheng Tung, Cupertino, CA (US); Michael J. Hanlon, Austin, TX (US); Tharaknath Capirala, Austin, TX (US); Arvind Narain, San Jose, CA (US); Subbarao Kakarlamudi, Milpitas, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 256 days.

(21) Appl. No.: 15/030,285

(22) PCT Filed: Oct. 16, 2013

(86) PCT No.: PCT/US2013/065234
§ 371 (c)(1),
(2) Date: Apr. 18, 2016

(87) PCT Pub. No.: WO2015/057214
PCT Pub. Date: Apr. 23, 2015

(65) Prior Publication Data
US 2016/0274940 A1 Sep. 22, 2016

(51) Int. Cl.
*G06F 9/50* (2006.01)
*G06F 16/245* (2019.01)
(Continued)

(52) U.S. Cl.
CPC .......... *G06F 9/505* (2013.01); *G06F 16/2282* (2019.01); *G06F 16/245* (2019.01); *G06F 16/283* (2019.01)

(58) Field of Classification Search
CPC ......... G06F 17/30339; G06F 17/30424; G06F 17/30592; G06F 9/505
See application file for complete search history.

(56) References Cited

U.S. PATENT DOCUMENTS 5,596,745 A * 1/1997 Lai ...................... G06F 17/3056
7,657,501 B1 2/2010 Brown et al.
(Continued)

FOREIGN PATENT DOCUMENTS

CN 101931609 B 12/2010
CN 103136055 6/2013

OTHER PUBLICATIONS

Cisco Systems, Inc., "Designing Secure Multi-tenancy Into Virtualized Data Centers", Mar. 16, 2010, 82 pages.
Elmore, et al., "Characterizing Tenant Behavior for Placement and Crisis Mitigation in Multitenant DBMSs,", SIGMOD '13, Jun. 22-27, 2013, New York, NY, USA, 12 pages.
(Continued)

*Primary Examiner* — Meng Ai T An
*Assistant Examiner* — Jorge A Chu Joy-Davila
(74) *Attorney, Agent, or Firm* — Hewlett Packard Enterprise Patent Department (57) ABSTRACT

Regulating enterprise database warehouse resource usage can include identifying a number of queries in an enterprise database warehouse (EDW) and regulating EDW resource usage among the number of queries.

19 Claims, 6 Drawing Sheets

(51) Int. Cl.
  *G06F 16/28*  (2019.01)
  *G06F 16/22*  (2019.01)

(56) References Cited

U.S. PATENT DOCUMENTS

| | | | |
|---|---|---|---|
| 8,099,411 B2 | 1/2012 | Richards et al. | |
| 2005/0010572 A1* | 1/2005 | Clark | G06F 17/30592 |
| 2007/0271570 A1 | 11/2007 | Brown et al. | |
| 2009/0037923 A1* | 2/2009 | Smith | G06F 16/24539 |
| | | | 718/104 |
| 2009/0158299 A1* | 6/2009 | Carter | G06F 9/4843 |
| | | | 719/319 |
| 2009/0178042 A1 | 7/2009 | Abhay et al. | |
| 2010/0077449 A1 | 3/2010 | Kwok et al. | |
| 2010/0083264 A1 | 4/2010 | Abhay et al. | |
| 2010/0293135 A1 | 11/2010 | Candea et al. | |
| 2013/0139172 A1 | 5/2013 | An et al. | |
| 2013/0238557 A1 | 9/2013 | Mandelstein et al. | |
| 2014/0075499 A1* | 3/2014 | Arun | H04L 41/5041 |
| | | | 726/1 |
| 2015/0254264 A1* | 9/2015 | Yu | G06F 11/1469 |
| | | | 707/674 |
| 2016/0274940 A1 | 9/2016 | Birdsall et al. | |

OTHER PUBLICATIONS

Narasayya, et al., "SQLVM-Performance Isolation in Multi-tenant Relational Database-as-a-service", 6th Biennial Conference (CIDR '13), Jan. 6-9, 2013, Asilomar, CA, 9 pgs.

The International Searching Authority, Appl No. PCT/US2013/065234, Filed Oct. 16, 2013, Search Report and Written Opinion, 10pgs, dated Jul. 24, 2014.

Extended European Search Report dated May 11, 2017 for EP Application No. 13895753.5; pp. 8.

Unknown., "The Future of Cloud Computing", Rapporteur: Schubert, Lutz; Editors: Jeffery, Keith; Neidecker-Lutz, Burkhard;, Jan. 25, 2010, 71 pages.

International Preliminary Report on Patentability received for PCT Patent Application No. PCT/US2013/065234, dated Apr. 28, 2016, 7 pages.

* cited by examiner

REGULATING ENTERPRISE DATABASE WAREHOUSE RESOURCE USAGE OF DEDICATED AND SHARED PROCESS BY USING OS KERNELS, TENANTS, AND TABLE STORAGE ENGINES

BACKGROUND

Databases can include an organized collection of data, and can be managed by systems that interact with users and other applications to capture and analyze data. Databases and cloud environments can support a variety of concurrent application workloads. Database management systems can be used to maximize utilization of the database and decrease latency.

DETAILED DESCRIPTION

A server (e.g., database) in a network can receive queries from one or more client devices (e.g., computers) that are connected to the network. A query can be, for example, a request to search or retrieve some data that is stored in the server. A process in the server can process and service the queries that are received by the server. However, when concurrent queries are sent to the server, the queries can compete for system resources in the server, such as, for example, CPU (central processing unit) resources, memory, data access, and/or data transport.

Organizations may utilize Enterprise Data Warehouses (EDWs) (e.g., data repositories from a number of disparate sources) to store information and make it accessible within the organization. In some examples, an EDW can include a number of EDW clients (e.g., organizations, and/or functions within an organization). Each of the number of EDW clients can share resources (e.g., CPU resources, relational tables, and/or indexes, among other resources) within a particular EDW. Similarly, each of the EDW clients can have a workload which is managed by the EDW. These workloads can have varying service levels that must be met. As used herein, a service level refers to the admission and execution rules for a particular service. For example, a service level can specify a particular throughput speed (e.g., 5 seconds) for processing of a query.

Many EDWs process and service queries as they are received without restrictions. However, certain queries received from EDW clients may be more important than others, and therefore should warrant a greater allocation of resources. Admission control systems can be used to control when queries are started in the EDW. However, once work is admitted to the EDW, admission control systems do not provide a mechanism to speed up or slow down query processing according to resource usage. Similarly, resource governors can control resource usage of an EDW client. Resource governors can automatically end a query that exceeds system resources that are allocated for the query. However, such resource threshold controls are generally difficult to maintain, can incorrectly end a business-critical query, and do not work well for shared resources.

In contrast, in accordance with examples of the present disclosure, a multitenancy system for resource management can enable the monitoring and control of EDW resources by tenant. Similarly a multitenancy system according to the present disclosure can allow for the definition of different resource controls for different workloads and/or cost levels under a particular tenant, which enables setting different service levels for tenants.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

Figure 1:
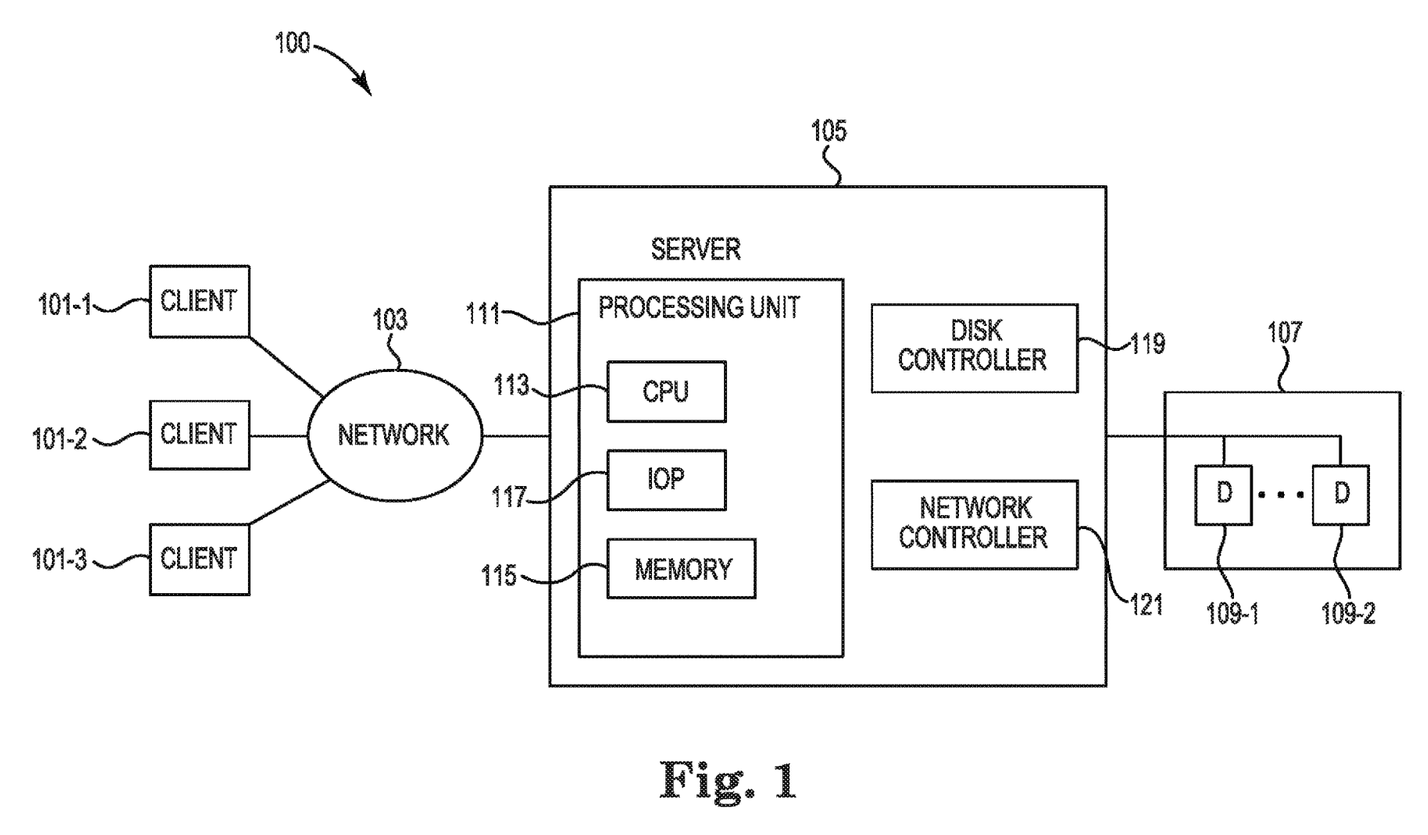
FIG. 1 is an illustration of an EDW system in accordance with the present disclosure.

FIG. 1 is an illustration of an EDW system 100 in accordance with the present disclosure. A number of clients 101-1, 101-2, 101-3 (e.g., computers) can communicate via a network (e.g., network 103) with a server (e.g., server 105). The server can be connected to one or more storage volumes (e.g., storage volumes 107) which may be formed by, for example, storage disks (e.g., storage disk 109-1, 109-2). The network can be, for example, a public network such as the Internet or a private network such as a local area network (LAN). Although FIG. 1 illustrates a single server connected to a network and storage volumes, examples of the present disclosure can include a number of servers.

The server can include a processing unit (e.g., processing unit 111) which can be grouped in pairs of processing units. A processing unit can include a CPU (e.g., CPU 113), a memory (e.g., memory 115), and/or an input/output processor (IOP) (e.g., IOP 117). A disk controller (e.g., disk controller 119) can permit the server to communicate with the storage volume, and a network controller (e.g., network controller 121) can permit the server to communicate across the network. A disk controller (e.g., disk controller 119) can include a disk driver, and a network controller (e.g., network controller 121) can include a network driver.

Figure 2:
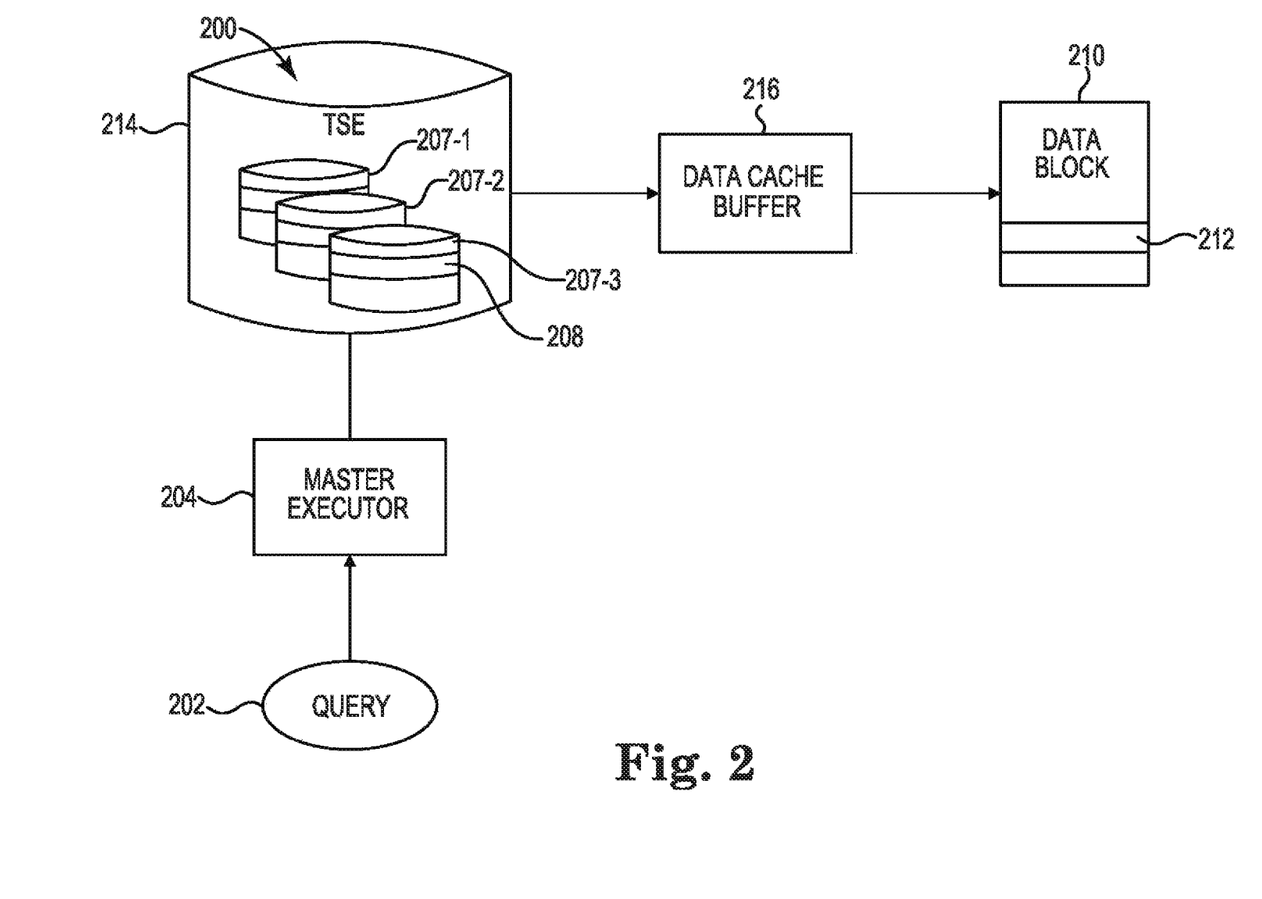
FIG. 2 is an illustration of a data flow of queries in an EDW system.

FIG. 2 is an illustration of a data flow of queries in an EDW system 200. One or more queries 202 can be initiated by a user of a client device and/or a query can be a scheduled query that is sent from a client device. A query 202 can include a Structured Query Language (SQL) query (e.g., a query based on a computer language that is designed for the retrieval and management of data in relational database management systems). As mentioned above, a query 202 can be, for example, a request to search or retrieve some data that is stored in a storage area (e.g., volume 207-1, volume 207-2, volume 207-3, herein referred to as storage volume 207) that is associated with the server. When the queries 202 are received by the server, the queries 202 can be compiled by standard higher layer software in the server. These higher layer software elements may gather statistics that are associated with the queries 202.

In response to a server receiving a query 202, a master executor 204 can request the service of Table Storage Engine (TSE) 214 which can provide data access services to the storage volume 207. A master executor, as used herein, can include an engine which executes the root portion of a query plan. A query plan can include an ordered series of steps to access data in an SQL relational database management system. The TSE 214 can perform a number of data access services such as: row retrieval, predicate evaluation (e.g., values of interest are extracted from a candidate row and evaluated against the predicate), and process (e.g., projection, aggregation, joins, and/or unions of data).

In a number of examples, the TSE 214 can include a component that enables the EDW system 200 to manage concurrency of access to storage volumes 207, generate audits, and/or manage transactional semantics. In some examples, a TSE can be partitioned into a number of TSE instances, wherein each TSE instance is designated for a particular fragment of data. Further, a TSE can include a number of storage volumes (e.g., 207-1, 207-2, 207-3), and each storage volume can include a number of tables (e.g., table 208). A table 208 can include a number of data blocks 210, and each data block can include a number of rows 212 of data.

When the server 105 (FIG. 1) receives a query 202, a TSE 214 can issue cache calls to data cache buffers 216 that store prefetched data blocks 210, so that the TSE 214 can quickly access and read the data blocks 210 in response to the query 202. In some examples, the TSE 214 can assign a query identifier (ID) to each cache call, in order to indicate that the cache call is in response to (and is associated with) the query 202. In some instances, a query 202 can be categorized as a "TSE-intensive query". A TSE-intensive query can include a query that utilizes a relatively large amount of TSE resources in executing processes. To manage TSE-intensive queries, TSEs can be configured to allocate resources by tenant, as discussed further herein.

Figure 3:
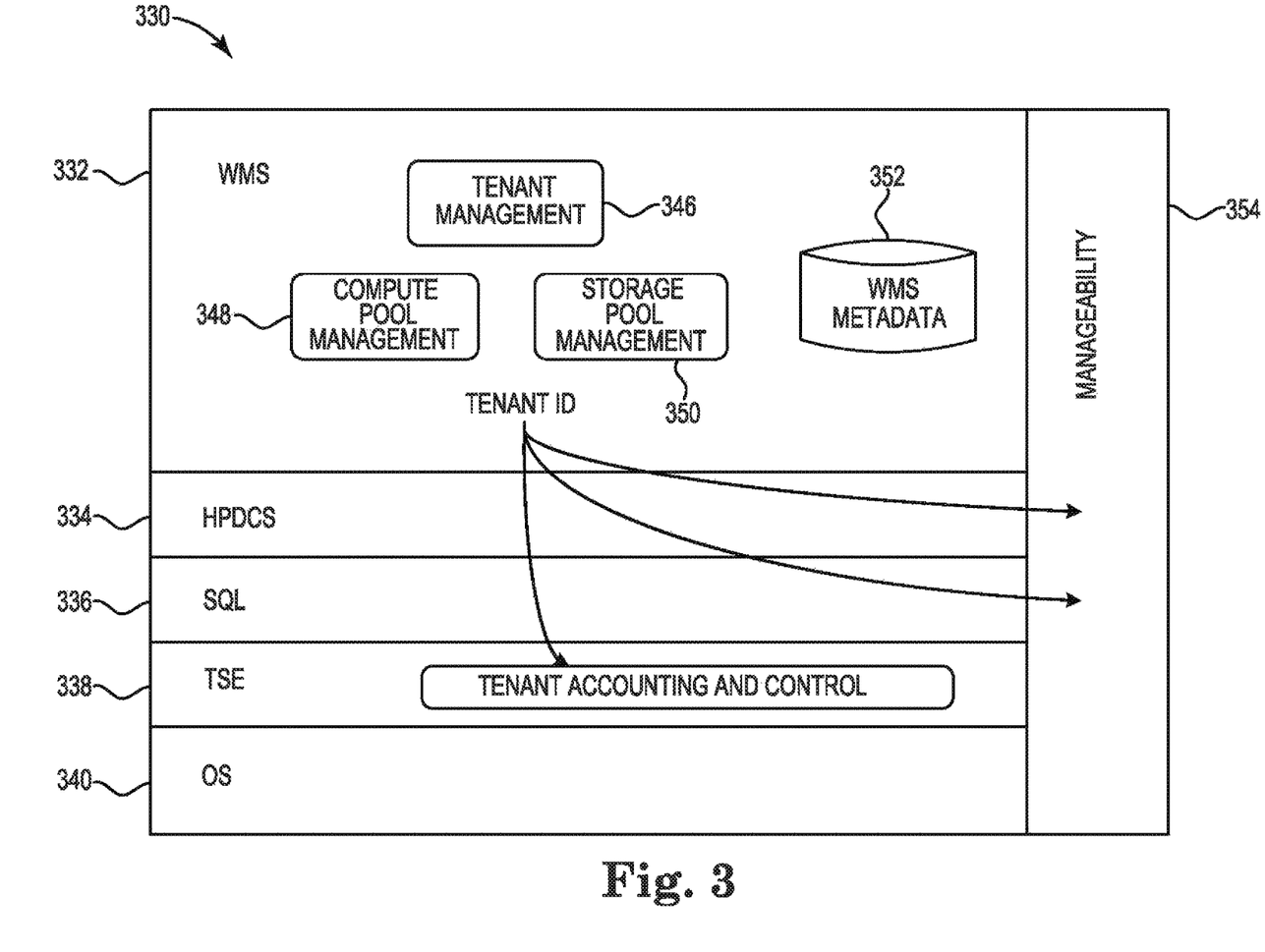
FIG. 3 illustrates an example EDW architecture for managing computing resources among tenants in accordance with the present disclosure

FIG. 3 illustrates an example EDW architecture 330 for managing computing resources among tenants in accordance with the present disclosure. A number of resources can be shared among tenants of the EDW. As used herein, a tenant can include a unit of resource accounting and control. In a number of examples, a tenant can be associated with a number of service levels for a number of queries.

The EDW architecture 330 can execute a number of dedicated processes and a number of shared processes to manage computing resources among tenants. A dedicated process can include a process that is dedicated to the execution of a particular query. Examples of dedicated processes can include an Open Database Connectivity (e.g., ODBC) server, an Executor Server Process (ESP), a Structured Query Language (SQL) compiler, and/or a User Defined Routine (UDR) server. An ODBC server can include a server process that services an ODBC connection to a database. An ESP can include a process that executes a portion of a query plan. Further, a SQL compiler can include a process that compiles SQL statements into query plans. A shared process can include a process that multiplexes (e.g., combines multiple data streams into one signal over a shared medium) work for a plurality of queries at one time. Examples of shared processes include TSE processes. In a number of examples, a query can be broken into a number of fragments, some of which execute in dedicated processes while others execute in shared processes.

In a number of examples of the present disclosure, dedicated processes can be managed by kernels to limit, account, and isolate resource usage by tenants. For example, Linux 6 control groups (cgroups) can be used to regulate resource allocation and usage. However, for shared processes, resources can be guarded by semaphores (e.g., a synchronization object that controls access by multiple processes to a common resource in a parallel programming environment). Further, queries can be prioritized, such that queries with a high priority can be executed prior to queries with a low priority. The use of kernels to manage resource usage for shared processes can result in a priority inversion (e.g., lower priority query can hold a semaphore for a higher priority query and thereby prevent the execution of the higher priority query). Instead, shared processes can be managed at the tenant level as discussed further herein.

As illustrated in FIG. 3, the EDW architecture 330 can include a Workload Management System (WMS) 332. A WMS 332 can include a system for identifying a tenant associated with a workload. For example, when a user connects to the EDW, a number of attributes can be identified by the WMS 332, such as an application name, an application type, an application identifier (ID), and/or a user ID among other attributes. The WMS 332 can then compare the identified attributes against a number of connection rules (e.g., a number of user configurable rules that assign particular workloads to particular tenants) that define particular tenants. For example, the WMS 332 can include an application programming interface (API) that, on a particular application (e.g., a finance application) assigns workloads having a cost greater than 500 to a first tenant, and workloads having a cost less than 500 to a second tenant. Based on the tenant associated with the attributes, a tenant ID can be associated with the workload.

A WMS 332 can include a number of components. For example, the WMS 332 can include a tenant management component 346. The tenant management component 346 can execute a number of commands to manage tenants. For example, the tenant management component 346 can create and configure new tenants. Similarly, the tenant management component 346 can modify the configuration of existing tenants, destroy and/or delete existing tenants, display the configuration of existing tenants, and/or display resource consumption by existing tenants.

The WMS 332 can also include a compute pool management component 348. The compute pool management component 348 can include processes and/or rules to manage a physical compute pool and a virtual compute pool. As used herein, a physical compute pool can include a subset of computing nodes on which the EDW system runs. The physical compute pool can limit where dedicated processes of a query are executed. Also, as used herein, a virtual compute pool can include a portion of a physical compute pool that places a limit on the amount of compute time and/or memory used by a number of queries within that physical compute pool. For example, a user can limit a number of queries to use no more than 25% of the compute resource on a number of computing nodes. Each virtual compute pool can be associated with one physical compute pool. In some examples, a number of virtual compute pools can be configured in a same manner using a virtual compute pool template. A virtual compute pool template can specify the configuration of a virtual compute pool and can be used to configure and/or reconfigure a number of virtual compute pools such that a number of virtual compute pools can be configured in a same manner. For instance, in an EDW with several virtual compute pools dedicated to high cost queries, a user can use a virtual compute pool template to limit high cost queries to no more than 20% of the virtual compute pool tenant's allocations. In some examples, a number of virtual compute pools can be reconfigured simultaneously by changing the virtual pool template from which they were originally configured.

Similarly, the WMS 332 can include a storage pool management component 350. The storage pool management component 350 can include storage systems in the EDW. For example, the storage pool management component 350 can include a collection of data volumes (e.g., data volumes 207, illustrated in FIG. 2) and/or a percentage quota on the amount of space used on a number of data volumes. A user and/or administrator of the EDW system can control the placement and size of objects created by a tenant by using the storage pool management component 350.

Additionally, the WMS 332 can include a WMS metadata table 352. The WMS metadata table 352 can include metadata defining tenants, as well as compute pools and storage pools. In a number of examples, the connection rules that define particular tenants can be stored in the WMS metadata table 352.

As illustrated in FIG. 3, the tenant ID can be communicated to additional layers in the EDW architecture 330. For example, the tenant ID can be communicated to a High Performance Distributed Computing System (HPDC) layer 334, and/or a SQL layer 336. Both the HPDCS layer and the SQL layer can report information relating to a particular tenant ID to a manageability layer 354. The manageability layer 354 can report statistical information about the functioning of the EDW system. For example, the manageability layer 354 can report ongoing statistics about query execution time, among other statistics.

In a number of examples, a tenant ID can become a part of a session ID (e.g., an identifier that identifies the session in which the queries are going to be executed) associated with a workload. For example, upon connection to the EDW, the WMS 332 can associate a tenant ID with a session, and the tenant ID can be communicated to the session through a statement executed at session start time. The tenant ID can then be incorporated in the session ID and remain associated with the tenant ID for the remainder of the session. In some examples, the SQL layer 336 can extract the tenant ID from the session ID and communicate the tenant ID to the TSE layer 338 for tenant accounting and control, as discussed further herein.

The EDW architecture 330 can also include an operating system (OS) layer 340. OS layer 340 can include an operating system which utilizes kernels to manage dedicated resources. For instance, OS layer 340 can include Linux Red Hat or other Linux OS, and can utilize cgroups to manage dedicated resources.

While FIG. 3 illustrates an example EDW architecture 330 including six layers (e.g., WMS layer 332, HPDC layer 334, SQL layer 336, TSE layer 338, OS layer 340 and Manageability layer 354), the EDW architecture 330 can include more or fewer layers than illustrated.

Figure 4:
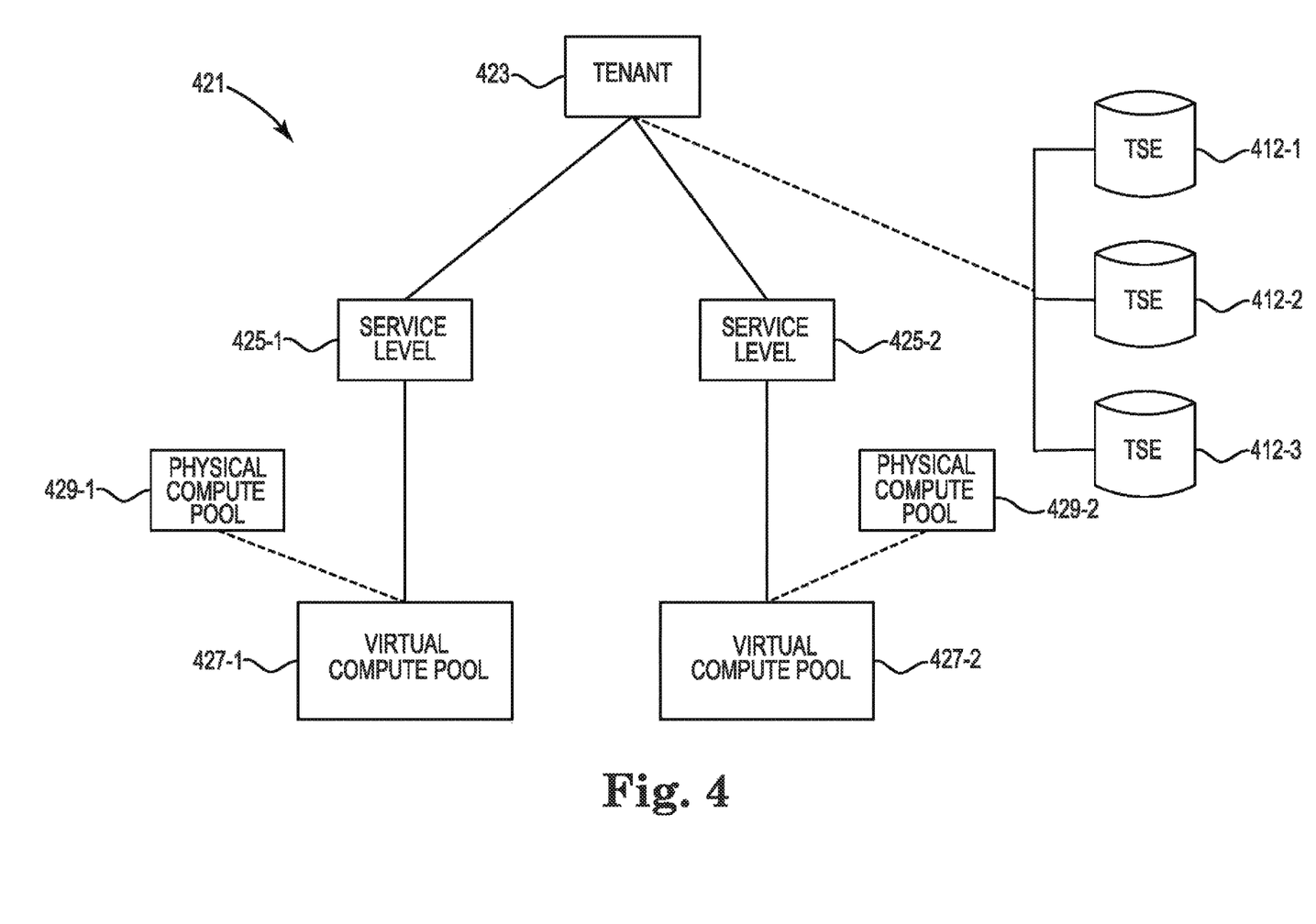
FIG. 4 illustrates an example of a system for managing computing resources among tenants in accordance with the present disclosure.

FIG. 4 illustrates an example of a system 421 for managing computing resources among tenants in accordance with the present disclosure. The system 421 can be executed by the WMS 332, illustrated in FIG. 3. As previously mentioned, a tenant ID can be communicated to TSEs for tenant accounting and control. For example, TSEs, once aware of tenant IDs, can execute tenant accounting and control logic to manage resources among a plurality of tenants in an EDW.

As illustrated in FIG. 4, a tenant (e.g., tenant 423) can be associated with a number of service levels (e.g., service level 425-1 and service level 425-2). Similarly, each service level in a WMS can be associated with one tenant at a time. As previously discussed, a service level can include a number of admission and execution rules for a particular service associated with a query. For example, a user can connect to an EDW and can submit a number of queries to the EDW. The initial connection of a user to an EDW is referred to herein as "session start time". At session start time, a number of service levels can be assigned to the queries submitted by the user. Similarly, each of the number of service levels can be associated with a tenant, and a tenant ID can be associated with the service level, as described in relation to FIG. 3. Therefore, a tenant can also be assigned at session start time.

Each tenant, and associated service level, can be associated with a virtual compute pool (e.g., virtual compute pool 427-1 and virtual compute pool 427-2). As discussed previously, each virtual compute pool can be associated with a physical compute pool (e.g., physical compute pool 429-1 and physical compute pool 429-2). Each dedicated process executed by the tenant 423 can be managed using kernels, the virtual compute pool (e.g., virtual compute pool 427-1), and the associated physical compute pool (e.g., physical compute pool 429-1). Similarly, each shared process executed by the tenant 423 can be managed by TSEs (e.g., TSE 412-1, TSE 412-2, TSE 412-3) using resource counters, as discussed further herein.

Figure 5:
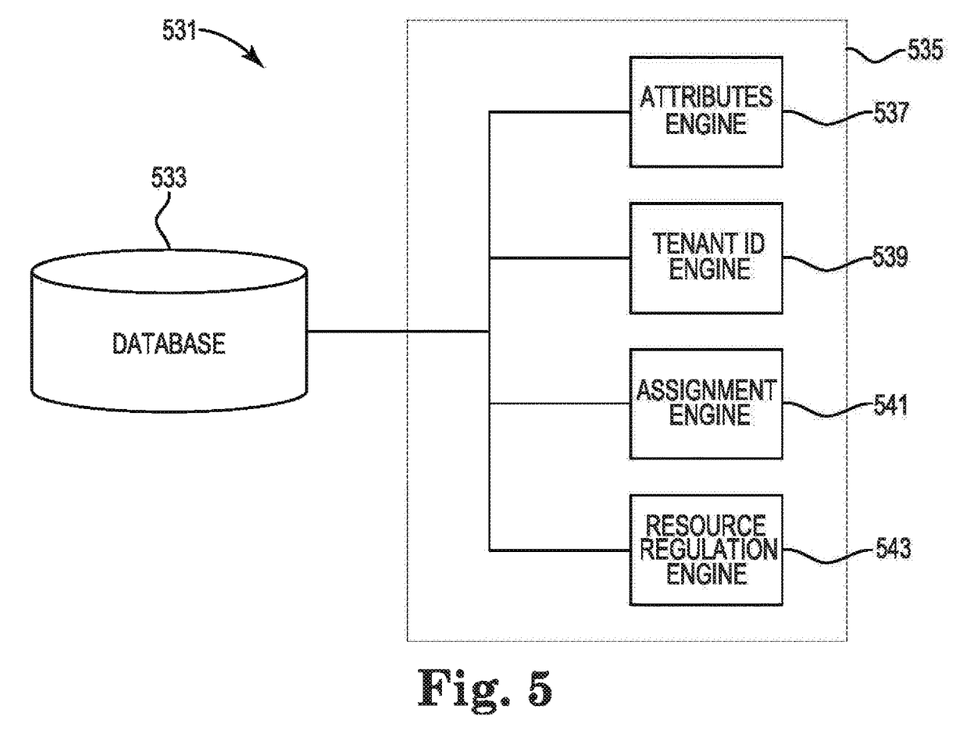
FIGS. 5-6 illustrate examples of systems according to the present disclosure.
Figure 6:
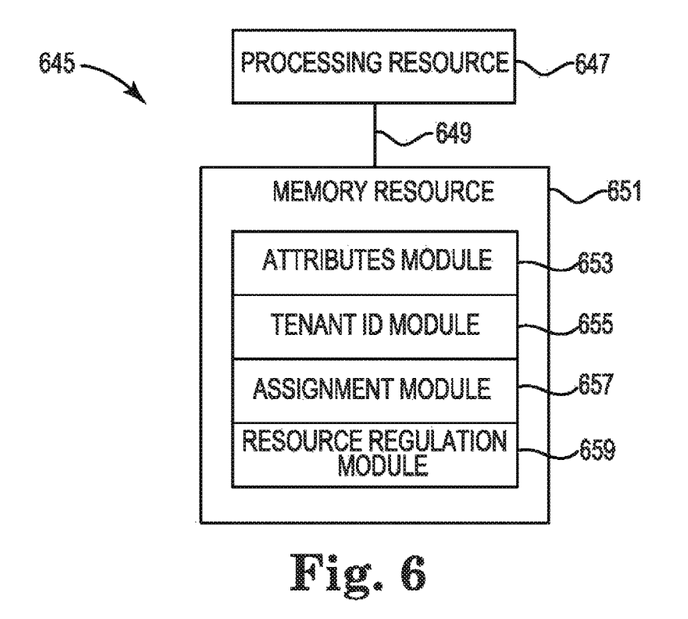

FIGS. 5-6 illustrate examples of systems 531, 645 according to the present disclosure. FIG. 5 illustrates a diagram of an example of a system 531 for managing resources among tenants according to the present disclosure. The system 531 can include a data store 533, a subsystem 535, and/or a number of engines 537, 539, 541, 543. The subsystem 535 can include the number of engines (e.g., attribute engine 537, tenant ID engine 541, assignment engine 541, and/or resource regulation engine 543) and can be in communication with the data store 533 via a communication link. The system 531 can include additional or fewer engines than illustrated to perform the various functions described herein.

The number of engines can include a combination of hardware and programming that is configured to perform a number of functions described herein (e.g., identify a number of attributes of a connection session with an enterprise database warehouse). The programming can include program instructions (e.g., software, firmware, etc.) stored in a memory resource (e.g., computer readable medium, machine readable medium, etc.) as well as hard-wired program (e.g., logic).

The attribute engine 537 can include hardware and/or a combination of hardware and programming to identify a number of attributes of a connection session with an enterprise database warehouse. For example, when a user connects to an EDW, a number of attributes can be identified by a WMS within the EDW, such as an application name, an application type, an application identifier (ID), and/or a user ID among other attributes. In a number of examples, an attribute can be associated with the type of workload a user submits to the EDW. For instance, a user of the EDW system could submit a number of online transaction processing (OLTP) requests, which include a number of short running queries such as insert, update and/or select. A number of attributes associated with the OLTP requests could be identified, such as job IDs, task IDs, and/or role IDs. Examples are not so limited, however, and an attribute can include other qualities, values, and/or alphanumeric identifiers that can be mapped to a particular tenant in the EDW system.

The tenant ID engine 539 can include hardware and/or a combination of hardware and programming to compare a number of attributes against a number of connection rules defining a number of tenants and assign a tenant ID based on the comparison. Connection rules, identified and/or managed by a user and/or administrator of the EDW system, can specify which attributes are assigned to which tenant.

The assignment engine 541 can include hardware and/or a combination of hardware and programming to assign workloads associated with the EDW connection to particular tenants, based on the comparison. For example, a rule can specify a particular processing speed and/or cost associated with a particular tenant, and workloads that fulfill the rule criteria can be assigned to the particular tenant. In a number of examples, a user and/or EDW administrator can add, modify and/or delete rules associated with particular tenants.

In some examples an interaction engine (not shown in FIG. 5) can collaborate with the assignment engine 541 and the resource regulation engine 543. The interaction engine can display on a graphical user interface, resource usage for a tenant selected from the number of tenants. For instance, users of the EDW system can view on a graphical user interface, resource use for their tenant ID. The user can view EDW system resource use as a whole, and view what portion of the EDW system the user's tenant ID consumes.

The resource regulation engine 543 can include hardware and/or a combination of hardware and programming to regulate resources within the enterprise database warehouse among the number of tenants. As discussed previously, the EDW system can execute a number of shared processes and dedicated processes. Resource allocation of dedicated processes can be regulated by kernels that assign resources to particular processes. For instance, the kernels can utilize CPU controllers to regulate the amount of CPU resources that are utilized by a dedicated process at a point in time. Similarly, kernels can utilize CPU accounting controllers and memory controllers.

Also, as discussed previously, resource allocation within shared processes can be regulated by TSEs within the EDW system. The TSEs can implement logic to count the number of times each query is executed on behalf of a particular tenant, herein referred to as a "query count". In some examples, the query count can include the number of times a particular query (e.g., SQL statement) has been executed from start to finish. Similarly, the query count can include the number of single execution instances of a particular query, which may or may not have been executed from start to finish. For instance, the EDW can include a number of tenants. Each tenant can maintain a query count which represents the number of times a query is executed on behalf of that particular tenant. Similarly, a TSE within the EDW system can implement logic to assign a pass count value which represents the number of times that a particular cache call (e.g., associated with a particular query) has passed over (e.g., has accessed) particular data blocks, within a particular time frame. Furthermore, each query can be associated with a query ID, and each tenant can be associated with a tenant ID.

In a number of examples, the resource regulation engine 543 can determine which queries, associated with particular tenants, are TSE intensive queries (e.g., queries that use a relatively large portion of TSE resources), using a tenant ID and a query ID. For example, a particular query can be associated with a particular cache call. If the particular cache call has accessed a number of data blocks only once within a given time window, then the pass count for that cache call can be set at value "1". If the particular cache call has accessed the number of data blocks twice within a given time window, then the pass count for that cache call can be set at value "2". The resource regulation engine 543 can examine the pass count for the particular cache call, and compare the pass count (e.g., using the query ID) against the proportion of resources the particular tenant was allocated within the EDW system (e.g., using the tenant ID). A particular query associated with the particular cache call can be referred to as a TSE intensive query when the pass count for the particular cache call causes the particular tenant to exceed the proportion of resources the particular tenant was allocated (e.g., if the pass count for the TSE intensive query exceeds a threshold).

In a number of examples, the allocation of EDW resources among a plurality of tenants can be managed by a number of Tenant Accounting and Control Tables (TACTs) maintained in a plurality of TSEs. For instance, a TACT can include an entry for each tenant ID included in the EDW and can define a desired resource allocation for each tenant ID. Similarly, the TACT can include an entry defining actual resource consumption for each tenant ID.

The resource regulation engine 543 can perform a number of actions in response to defining a particular query as a TSE intensive query. When a TSE identifies a particular query as a TSE intensive query, the TSE can respond in a number of ways. For instance, the TSE can generate a TSE report that can be analyzed by a user (e.g., a database administrator). The report can identify the query type, the data blocks that are passed by the cache call, the resources allocated to the tenant ID, the amount of actual resource utilization for the tenant ID, and/or other information that is associated with the TSE intensive query. In response to receiving the TSE report, the user can create filters for queries substantially similar to the TSE intensive query, and/or can program the TSE to assign a lower priority to queries substantially similar to the TSE intensive query.

FIG. 6 illustrates a diagram of an example computing device 645 according to the present disclosure. The computing device 645 can utilize software, hardware, firmware, and/or logic to perform a number of functions described herein.

The computing device 645 can be any combination of hardware and program instructions configured to share information. The hardware, for example can include a processing resource 647 and/or a memory resource 651 (e.g., computer-readable medium (CRM), machine readable medium (MRM), database, etc.) A processing resource 647, as used herein, can include any number of processors capable of executing instructions stored by a memory resource 651. Processing resource 647 may be integrated in a single device or distributed across multiple devices. The program instructions (e.g., computer-readable instructions (CRI)) can include instructions stored on the memory resource 651 and executable by the processing resource 647 to implement a desired function (e.g., regulate resources within the enterprise database warehouse among the number of tenants).

The memory resource 651 can be in communication with a processing resource 647. A memory resource 651, as used herein, can include any number of memory components capable of storing instructions that can be executed by processing resource 647. Such memory resource 651 can be a non-transitory CRM or MRM. Memory resource 651 may be integrated in a single device or distributed across multiple devices. Further, memory resource 651 may be fully or partially integrated in the same device as processing resource 647 or it may be separate but accessible to that device and processing resource 647. Thus, it is noted that the computing device 645 may be implemented on a participant device, on a server device, on a collection of server devices, and/or a combination of the user device and the server device.

The memory resource 651 can be in communication with the processing resource 647 via a communication link (e.g., a path) 649. The communication link 649 can be local or remote to a machine (e.g., a computing device) associated with the processing resource 647. Examples of a local communication link 649 can include an electronic bus internal to a machine (e.g., a computing device) where the memory resource 651 is one of volatile, non-volatile, fixed, and/or removable storage medium in communication with the processing resource 647 via the electronic bus.

A number of modules 653, 655, 657, 659 can include CRI that when executed by the processing resource 647 can perform a number of functions. The number of modules 653, 655, 657, 659 can be sub-modules of other modules. For example, the attribute module 653 and the tenant ID module 655 can be sub-modules and/or contained within the same computing device. In another example, the number of modules 653, 655, 657, 659 can comprise individual modules at separate and distinct locations (e.g., CRM, etc.).

Each of the number of modules 653, 655, 657, 659 can include instructions that when executed by the processing resource 647 can function as a corresponding engine as described herein. For example, the attribute module 653 can include instructions that when executed by the processing resource 647 can function as the attribute engine 637. In another example, the tenant ID module 655 can include instructions that when executed by the processing resource 647 can function as the tenant ID engine 639.

Figure 7:
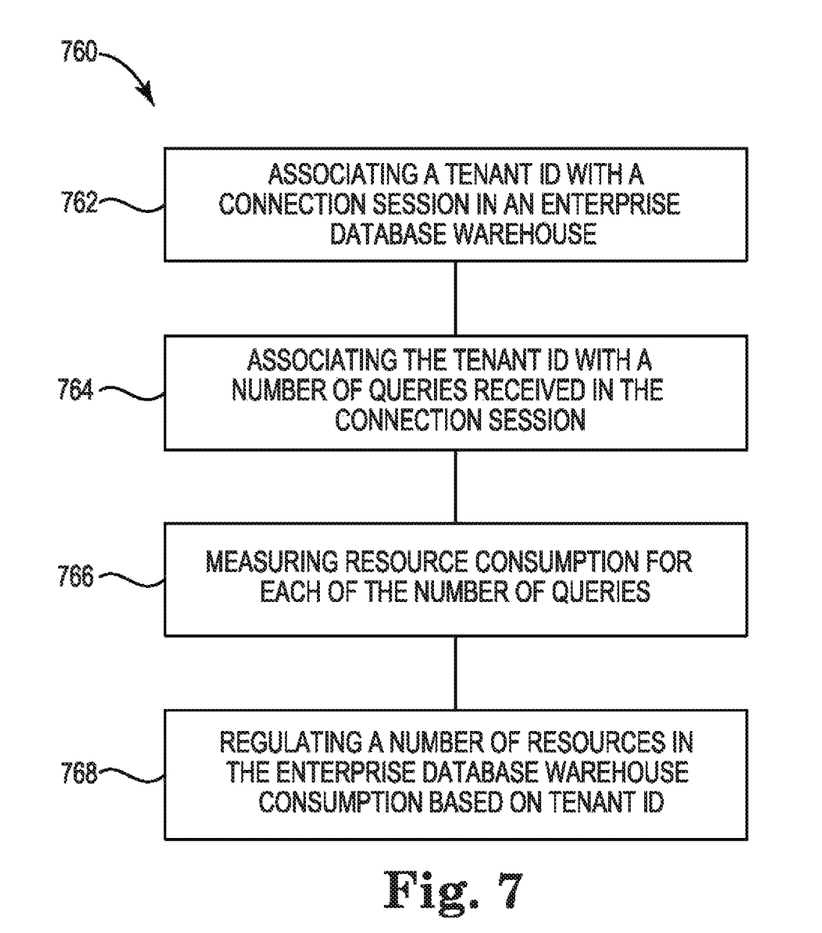
FIG. 7 illustrates a flow chart of an example method for resource management among database tenants according to the present disclosure.

FIG. 7 illustrates a flow chart of an example method 760 for resource management among database tenants according to the present disclosure. At 762, the method 760 can include associating a tenant ID with a connection session in an EDW. For instance, in response to a user connecting to an EDW (e.g., generating a connection session), a number of attributes can be determined based on queries generated by the user. The number of attributes can be mapped to a number of tenants based on a number of connection rules. Each of the number of tenants can be assigned a tenant ID, and the tenant ID that is mapped to the connection session can be incorporated into a session ID and associated with the connection session for its duration.

At 764, the method 760 can include associating the tenant ID with a number of queries received in the connection session. Each query can be assigned to a tenant ID and managed accordingly. At 766, the method 760 can include measuring resource consumption for each of the number of queries. The allocation of EDW resources among a plurality of tenants can be managed by a number of Tenant Accounting and Control Tables (TACTs) maintained in a plurality of TSEs. For instance, a TACT can include an entry for each tenant ID included in the EDW and can define a desired resource allocation for each tenant ID. Similarly, the TACT can include an entry defining actual resource consumption for each tenant ID.

In a number of examples, a tenant management component of the EDW system can manage tenants and resource allocations among them. For instance, a tenant management component can create and/or configure new tenants and/or can modify the configuration of existing tenants. TACTs can list the tenants configured by the tenant management component by tenant ID. Similarly, TACTS can list resource consumption by tenant ID and/or the resource consumption for a number of queries associated with the tenant ID. By identifying resource consumption by tenant ID and/or by query within a tenant, a TSE intensive query can be identified.

At 768, the method 760 can include regulating a number of resources in the enterprise database warehouse consumption based on tenant ID. When a particular query is identified as a TSE intensive query, a number of actions can be implemented. For instance, the TSE can generate a TSE report that can be analyzed by a user (e.g., a database administrator). In some examples, a TSE intensive query can be regulated by reducing the data access priority that is assigned to the query. The data access priority can include the priority of the query in access to data that are managed by the EDW. The data access priority can be reduced by a decrement value specified by a user and/or database administrator. Queries that are not assigned a decrement value can begin to obtain EDW resources. Additionally, a TSE intensive query can be deferred. The amount of time of a query deferral can be determined based on the amount the tenant associated with the query is over budget for EDW resources.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure. In addition, the proportion and the relative scale of the elements provided in the figures are intended to illustrate the examples of the present disclosure, and should not be taken in a limiting sense.

What is claimed:

1. A non-transitory computer-readable medium storing instructions executable by a processing resource to:
receive a first query from one or more client devices through a connection session to an enterprise database warehouse (EDW);
divide the first query of a plurality of queries in the EDW into a plurality of fragments, wherein each of the plurality of fragments executes in at least one dedicated process of a plurality of dedicated processes and at least one shared process of a plurality of shared processes;
regulate EDW resource usage among the plurality of dedicated processes using operating system (OS) kernels that assign a particular EDW resource to a particular dedicated process of the plurality of dedicated processes, wherein the particular dedicated process is dedicated to execution of a first fragment of the plurality of fragments, the OS kernels being part of an OS layer;
identify a plurality of attributes of a connection session of the client device with the EDW;

associate a tenant identifier (ID) of a tenant with the connection session in the EDW based on comparing attributes of the connection session with connection rules, wherein each of the plurality of tenants comprises a unit of resource accounting and control;

associate the tenant ID with the first query received in the connection session; and regulate EDW resource usage among the plurality of shared processes for respective tenants using the tenant ID and a plurality of table storage engines (TSEs) in a TSE layer different from the OS layer, the plurality of TSEs to access table rows, and a TSE of the plurality of TSEs comprising logic to determine whether processing of a given fragment of the query for a respective tenant has used an amount of a corresponding EDW resource that has exceeded a threshold, and to assign a lower priority to the first query in response to determining that processing of the given fragment of the query for the respective tenant has used the amount of the corresponding EDW resource that has exceeded the threshold.

2. The non-transitory computer-readable medium of claim 1, wherein the instructions to regulate the EDW usage among the plurality of dedicated processes comprise instructions executable by the processing resource to:

assign the particular EDW resource to the particular dedicated process using a physical compute pool.

3. The non-transitory computer-readable medium of claim 1, wherein the instructions to regulate the EDW resource usage among the plurality of dedicated processes comprise instructions executable by the processing resource to:

limit an amount of compute time used by queries executed by a physical compute pool.

4. The non-transitory computer-readable medium of claim 1, wherein the instructions to regulate the EDW resource usage among the plurality of shared processes using the plurality of TSEs comprise instructions executable by the processing resource to:

allocate a portion of an EDW resource to a tenant, wherein the tenant includes a unit of EDW resource accounting.

5. The non-transitory computer-readable medium of claim 1, wherein the TSEs perform retrieval of the table rows from tables and manipulation of data in the tables, wherein the assigning of the particular EDW resource to the particular dedicated process by a kernel of the kernels comprises assigning an amount of a central processing unit (CPU) resource to the particular dedicated process, and wherein the regulating of EDW resource usage among the plurality of shared processes using the plurality of TSEs comprises counting a number of times a query is executed on behalf of a respective tenant, and adjusting EDW resource usage based on the counting.

6. The non-transitory computer-readable medium of claim 1, comprising instructions executable by the processing resource to:

identify a plurality of attributes associated with a query among the plurality of queries; and assign the query to a first tenant from among the tenants based on the plurality of attributes.

7. The non-transitory computer-readable medium of claim 6, wherein the first tenant is associated with a particular service level, and the non-transitory computer-readable medium comprises instructions executable by the processing resource to:

assign the query to the first tenant in response to a determination that the query is associated with the particular service level.

8. A system comprising:

a processor;

a non-transitory storage medium storing instructions executable on the processor to:

receive a first query from a client device through a connection session to an enterprise database warehouse (EDW);

divide the first query of a plurality of queries in the EDW into a plurality of fragments, wherein each of the plurality of fragments executes in at least one dedicated process of a plurality of dedicated processes and at least one shared process of a plurality of shared processes;

identify a plurality of attributes of the connection session with the EDW;

compare the plurality of attributes against a plurality of connection rules that assign workloads to a plurality of tenants, each of the plurality of tenants comprising a unit of resource accounting and control;

associate a tenant identifier (ID) of a tenant among the plurality of tenants with the connection session based on the comparing;

associate the tenant ID with the first query received in the connection session; and regulate EDW resources among the plurality of tenants, the regulating comprising:

using operating system (OS) kernels that assign a particular EDW resource to a dedicated process that is dedicated to execution of a fragment of the first query, the OS kernels being part of an OS layer, using the tenant ID and a plurality of table storage engines (TSEs) in a TSE layer different from the OS layer, the plurality of TSEs to access table rows, and a TSE of the plurality of TSEs comprising logic to determine whether processing of a given fragment of the first query for a respective tenant of the plurality of tenants has used an amount of a corresponding EDW resource that has exceeded a threshold, and reducing a priority of the first query for the respective tenant in response to detecting usage of the corresponding EDW resource that exceeds the threshold.

9. The system of claim 8, wherein the plurality of attributes include at least one of: an application name, an application type, or an application identifier.

10. The system of claim 8, wherein the instructions are executable on the processor to display on a graphical user interface, resource usage of the EDW resources for the tenant.

11. The system of claim 8, wherein the instructions are executable on the processor to:

maintain a pass count value representing a number of times that a particular query has accessed data blocks in the EDW within a particular period of time;

examine the pass count value for the particular query;

determine if the particular query is a resource intensive query based on the pass count value; and adjust EDW resource usage for the resource intensive query.

12. The system of claim 8, wherein the instructions are executable on the processor to:

maintain a tenant accounting and control table (TACT), wherein the TACT defines the plurality of tenants and a resource allocation for each respective tenant among the plurality of tenants.

13. The system of claim 8, wherein the connection session comprises a plurality of queries, and wherein the instructions are executable on the processor to:
assign each of the plurality of queries associated with the connection session to a respective tenant among the plurality of tenants, based on the comparing.

14. The system of claim 8, wherein the regulating of the EDW resources comprises adjusting, by a kernel of an operating system, central processing unit (CPU) resource usage of a dedicated process that executes a portion of a query.

15. A method executed by a system comprising a hardware processor for resource management among database tenants, comprising:
receiving a first query from one or more client devices through a connection session to an enterprise database warehouse (EDW);
dividing the first query of a plurality of queries in the EDW into a plurality of fragments, wherein each of the plurality of fragments executes in at least one dedicated process of a plurality of dedicated processes and at least one shared process of a plurality of shared processes;
associating a tenant identifier (ID) of a tenant with the connection session in the EDW based on comparing attributes of the connection session with connection rules that assign workloads to a plurality of tenants, each of the plurality of tenants comprising a unit of resource accounting and control;
associating the tenant ID with the first query received in the connection session;
measuring resource consumption for each of the plurality of queries; and
regulating a plurality of resources in the EDW for the plurality of queries based on the tenant ID and the measured resource consumption, the regulating comprising:
using operating system (OS) kernels that assign a particular EDW resource to a dedicated process that is dedicated to execution of a particular fragment of the query in the plurality of queries, the OS kernels being part of an OS layer,
using the tenant ID and a plurality of table storage engines (TSEs) in a TSE layer different from the OS layer, the plurality of TSEs to access table rows, and a TSE of the plurality of TSEs comprising logic to determine whether processing of a given fragment of the query for a respective tenant of the plurality of tenants has used an amount of a corresponding EDW resource that has exceeded a threshold, and
reducing a priority of the given query for the respective tenant in response to detecting usage of the corresponding EDW resource that exceeds the threshold.

16. The method of claim 15, wherein regulating the plurality of resources based on the tenant ID comprises:
identifying a query among the plurality of queries as a table storage engine (TSE) intensive query.

17. The method of claim 16, comprising deferring the TSE intensive query for a period of time, in response to the identification of the query as the TSE intensive query.

18. The method of claim 16, comprising:
reducing an execution priority of the TSE intensive query, in response to the identification of the query as the TSE intensive query;
wherein the execution priority identifies an order of execution of the plurality of queries such that a first query among the plurality of queries with a high priority is executed prior to a second query among the plurality of queries with a low priority.

19. The method of claim 15, wherein regulating the plurality of resources based on the tenant ID comprises:
comparing the measured resource consumption for the tenant ID against a resource allocation for the tenant ID.

* * * * *